United States Patent [19]

Bossaerts et al.

[11] Patent Number: 6,085,842
[45] Date of Patent: Jul. 11, 2000

[54] METHOD OF TREATING AN UNDERGROUND FORMATION

[75] Inventors: Jan Dirk Bossaerts; Gerbrand Jozef Maria van Eijden, both of Rijswijk, Netherlands

[73] Assignee: Shell Oil Company, Houston, Tex.

[21] Appl. No.: 09/130,256

[22] Filed: Aug. 6, 1998

Related U.S. Application Data

[63] Continuation of application No. 08/757,198, Nov. 27, 1996.

[30] Foreign Application Priority Data

Nov. 28, 1995 [EP] European Pat. Off. .............. 95203271

[51] Int. Cl.⁷ ................................................ E21B 33/138
[52] U.S. Cl. .......................................... 166/295; 166/300
[58] Field of Search ................................... 166/295, 300, 166/292, 276

[56] References Cited

U.S. PATENT DOCUMENTS

| | | | |
|---|---|---|---|
| 3,481,403 | 12/1969 | Gidley et al. ............................ | 166/295 |
| 3,552,493 | 1/1971 | Bezemer ................................ | 166/295 |
| 3,741,308 | 6/1973 | Veley ..................................... | 166/292 |
| 3,915,232 | 10/1975 | Gruesbeck et al. ..................... | 166/295 |
| 4,428,426 | 1/1984 | Davies et al. ........................... | 166/276 |
| 5,423,381 | 6/1995 | Surles et al. ............................ | 166/295 |

FOREIGN PATENT DOCUMENTS

| | | | |
|---|---|---|---|
| 463 664 A1 | 6/1991 | European Pat. Off. ...... | E21B 33/138 |
| 2 046 816 | 11/1980 | United Kingdom ........... | C09K 17/00 |

OTHER PUBLICATIONS

International Search Report of Mar. 24, 1997.

*Primary Examiner*—Frank Tsay

[57] ABSTRACT

A method of treating an underground formation is provided, the method including sequential steps of:

(a) contacting the formation with an aqueous medium;

(b) contacting the formation with a hydrocarbon fluid;

(c) contacting the formation with a solvent in the form of a glycol ether;

(d) contacting the formation with a consolidation solution of between 30 and 60 % m of monomeric and/or polymeric organic polyepoxides having more than one epoxy group per molecule and between 5 and 20% m of a curing agent in the solvent; and (e) contacting the formation with a viscosified fluid containing aliphatic hydrocarbons.

5 Claims, No Drawings

METHOD OF TREATING AN UNDERGROUND FORMATION

RELATED PATENT APPLICATION

This patent application is a continuation application to U.S. patent application Ser. No. 08/757,198, filed on Nov. 27, 1996.

FIELD OF THE INVENTION

The present invention relates to a method of treating an underground formation to improve its strength. The method is particularly suitable for treating an underground hydrocarbon-containing formation from which hydrocarbons can be produced.

BACKGROUND TO THE INVENTION

Production of hydrocarbons from reservoirs is usually done through a well drilled from surface to the reservoir. Such a well is cased to prevent collapse of its wall. To facilitate fluids flowing into the well, the part of the well extending into or through the reservoir is either not cased or, when cased, the casing is perforated locally. If the underground formation includes sandstone, production of hydrocarbons may cause formation minerals such as sand to be loosened and to be entrained by the fluids flowing into the well, particularly after water break through. The entrained materials cause wear of production equipment through which the fluid passes, and it is expensive to separate and to dispose the material. To reduce the amount of entrained materials, the formation is strengthened using an epoxy resin system.

A problem is encountered when the underground formation includes "dirty" sand. Dirty sand is sand which is covered with contaminants such as hydrocarbon oil and water. The presence of these contaminants will adversely affect the bond between the sand particles and the epoxy resin and consequently the strength of the treated formation.

U.S. Pat. No. 3,481,403 suggests a method of treating an underground formation which includes the steps of contacting the underground formation with a solvent in the form of an alkyl ether of a $C_2$ to $C_6$ glycol containing at least one $C_1$ to $C_6$ alkyl group, and thereafter contacting the formation with a consolidation solution of an epoxy resin and a curing agent in a solvent of alcohol-kerosene. The solvent may be preceded by an oil preflush to remove water blocks. Moreover, if the formation has already produced large volumes of sand, a suspension of sand in water or oil can be injected before the treating starts to complement the lost sand.

U.S. Pat. No. 3,915,232 discloses a method of treating an underground formation comprising the sequential steps of:

(a) contacting the formation with an aqueous medium;

(b) contacting the formation with a hydrocarbon fluid in order to displace water; and (c) contacting the formation with a solvent in the form of a glycol ether in order to displace the residual hydrocarbon and water.

In this known method a sand screen of bonded sand grains is to be placed in a well in the annulus between the casing and the formation. Therefore, in step (a) of the known method a slurry of sand in brine is injected through perforations in the casing into the well in order to place the sand behind the casing in the annulus. In order to bond the sand grains to form a screen, a consolidation solution containing an epoxy resin and a catalyst is injected through the perforations in the casing. The solvent used in the consolidation solution is a different solvent than the glycol ether used to displace the residual hydrocarbon and water.

European patent application publication No. 463 664 discloses a method of treating an underground formation, wherein the consolidation solution comprises polyepoxides, a curing agent, a glycol ether and a polyalkylene glycol. The treatment can be followed by an over-flush of a hydrocarbon solvent mixture to remove excess resin. It would be desirable to increase the epoxide-content of the consolidation solution without affecting the viscosity.

It is an object of the present invention to improve the above described method. It is a further object to provide a method for treating an underground formation a consolidation solution with a large concentration of epoxy resin can be used.

SUMMARY OF THE INVENTION

These and other objects are accomplished by a method for treating an underground formation which includes the sequential steps of:

(a) contacting the formation with an aqueous medium;

(b) contacting the formation with a hydrocarbon fluid;

(c) contacting the formation with a solvent in the form of a mixture of glycol ethers;

(d) contacting the formation with a consolidation solution of between 30 and 60% m (per cent by mass) of monomeric and/or polymeric organic polyepoxides having more than one epoxy group per molecule and between 5 and 20% m of a curing agent in the solvent; and (e) contacting the formation with a viscosified fluid containing aliphatic hydrocarbons.

The present invention involves treating an underground formation, wherein the formation is first treated in order remove oil and water from the pores of the formation and wherein the formation is subsequently strengthened by contacting it with a consolidation solution containing and epoxide and a curing agent. To remove oil and water from the pores three subsequent pre-flushes are employed, wherein in the third pre-flush a glycol ether solvent is used. Furthermore, to restore permeability after the formation has been contacted with the consolidation solution, the formation is contacted with a viscosified fluid containing aliphatic hydrocarbons. An essential aspect of the present invention is that the glycol ether solvent does not only form the third pre-flush but it is also used as solvent in the consolidation solution. A further aspect is that to restore permeability an over-flush containing aliphatic hydrocarbons is used. The use of aliphatic hydrocarbons has a further unexpected advantageous effect, namely the time required for the epoxy resin to set is substantially shortened.

The term "glycol ether" refers to an ether of a $C_2$ to $C_6$ dihydric alcohol containing at least one $C_1$ to $C_6$ alkyl group, and the term "epoxy resin" will be used to refer to monomeric and/or polymeric organic polyepoxides having more than one epoxy group per molecule.

DESCRIPTION OF A PREFERRED EMBODIMENT

In the specification and in the claims "% m" means per cent by mass of the solution.

In the method of the present invention, the formation is contacted with three pre-flushes which are injected into the formation one after the other. The first pre-flush is an aqueous medium, the aqueous medium is injected into the formation to displace oil present in the pores of the formation away from the zone to be treated. The displacement of oil by the aqueous medium is an immiscible displacement, and consequently some oil will not be removed. The oil that is not removed is called connate oil. Thereafter the formation is contacted with a hydrocarbon fluid to displace water present in the pores away from the zone to be treated. Moreover, the hydrocarbon fluid will dissolve any connate oil that has not been removed by the aqueous medium. The displacement of water by the hydrocarbon oil is also an immiscible displacement, and consequently some water will not be removed. However, as the displacement of connate oil by the hydrocarbon oil is miscible, substantially all connate oil is removed. Subsequently the formation is contacted with the solvent in the form of the mixture of glycol ethers to displace the residual hydrocarbon fluids and water. As the mixture of glycol ethers is miscible with both hydrocarbons and water, the displacement is miscible and substantially no hydrocarbons or water will be left in the formation. The formation is fully saturated with the solvent.

After the formation has been treated in this way, the formation is contacted with the consolidation solution of between 30 and 60% m of monomeric and/or polymeric organic polyepoxides having more than one epoxy group per molecule and between 5 and 20% m of a curing agent in the solvent.

The present invention is based on the finding that solvent in the form of the mixture of glycol ethers provides miscible displacement of both water and oil, and that the solvent is an excellent solvent for the epoxy resin and the curing agent. The latter feature allows contacting the formation with a concentrated consolidation solution of the epoxy resin, which consolidation solution has an acceptable viscosity. Moreover, as it is the same liquid as the liquid used in the last pre-flush, there are no compatibility problems.

The aqueous medium used in the first pre-flush may be a brine for example an aqueous solution of 2% m of KCl.

To restore permeability, after the formation has been contacted with the consolidation solution of step (d) the formation is contacted with a viscosified hydrocarbon fluid, for example a mixture of aliphatic hydrocarbons. This so-called over-flush will displace the majority of the resin phase and restore permeability. The viscosity of the over-flush is larger than the viscosity of the hydrocarbon pre-flush.

The oil can be any hydrocarbon oil, such as diesel oil or crude oil.

Suitable glycol ethers for the solvent are mono ethers of the dihydric alcohols. Very suitable are the glycol ethers selected from the group including methoxypropanol, butoxyethanol, hexoxyethanol and the isomers of these glycol ethers.

To adjust the viscosity of the solvent, the solvent may further contain a minor amount, for example less than 10% m, of a polyethylene glycol having an average molecular mass of about 400.

EXAMPLES

To illustrate that the consolidation solution of solvent and combination of polyepoxides and curing agent is not viscous the viscosity of several consolidation solutions was determined in a "CONTRAVES LS-30" Low Shear viscosimeter at a temperature of 25° C. The epoxy resin used was "EPIKOTE 828". This resin is a product of a reaction of diphenylol-propane with epichlorohydrin and has a molecular mass of between 300 and 450. The curing agent used was methylene dianiline. The results for different consolidation solutions have been summarized in Table 1. The term "solids content" is used to refer to the content of epoxy resin and curing agent.

TABLE 1

Viscosities in mPa.s of several consolidation solutions.

| | Solids content in % m | | | | |
|---|---|---|---|---|---|
| solvent | 30 | 40 | 50 | 60 | 70 |
| methoxypropanol | 4.84 | 8.04 | 14.1 | 26.1 | 70.5 |
| hexoxyethanol | 10.5 | 20.5 | 29.0 | 58.4 | 110 |

To illustrate the effect of method of the present on the unconfined compression strength, several samples were made and subjected to two treatments, a treatment according to the invention and a treatment not according to the invention. For each test three samples were made of Nieuwe Pekela sand (grain diameters in the range of from 0.075 to 0.150 mm) in a glass tube, each sample had a diameter of 3.5 cm and a length of 17 cm. After the sand had been placed in the tube the porosity, $\Phi$ (in %), was determined. The sand pack was flushed with butane to remove air, and thereafter the sand pack was flushed with an aliphatic hydrocarbon in which butane dissolves to remove the butane. Then the initial permeability, $K_i$ (in Darcy), was determined.

To simulate formation conditions, the following fluids were injected: (1) methoxypropanol; (2) brine (2% m KCl); and (3) about 10 pore volumes of crude oil to establish irreducible water saturation.

The samples were subjected to two treatments, a first one according to the invention, and a second one not according to the invention.

The treatment according to the invention comprises contacting the samples filled with crude oil at irreducible water saturation in the following sequence:

(a) contacting the sample with 2 pore volumes of a 2% m KCl brine;

(b) contacting the sample with 2 pore volumes of gasoil;

(c) contacting the sample with 2 pore volumes of methoxypropanol;

(d) contacting the sample with 1 pore volume of a consolidation solution of EPIKOTE 828 (Trade Name) and methylene dianiline in methoxypropanol, the solids content being 60% m; and (e) contacting the sample with 2 pore volumes of viscosified aliphatic hydrocarbons.

After the treatment the final permeability, $K_e$ (in Darcy), and the unconfined compression strength, UCS (in bar), were determined. The results are summarized in Table 2.

TABLE 2

Results of the treatments according to the present invention.

| | $\Phi$ in % | $K_i$ in D | $K_e$ in D | UCS in bar |
|---|---|---|---|---|
| Average | 36.07 | 4.72 | 4.19 | 143 |

In the treatment not according to the invention, the steps (a), (b) and (c) have been omitted. Thus the samples with crude oil at irreducible water saturation were only treated in accordance with steps (d) and (e) of the above example.

After the treatment the final permeability, $K_e$ (in Darcy), and the unconfined compression strength, UCS (in bar), were determined. The results are summarized in Table 3.

TABLE 3

Results of the treatments not according to the present invention.

| | Φ in % | $K_i$ in D | $K_e$ in D | UCS in bar |
|---|---|---|---|---|
| Average | 35.21 | 4.68 | 4.71 | 83 |

From the above data it can be concluded that the unconfined compression strength in the experiment with the method according to the present invention is larger than the unconfined compression strength with the method not according to the present invention.

The use of aliphatic hydrocarbons in the over-flush of the present invention has an unexpected effect of shortening the time required for the epoxy resin to set. This phenomenon can be shown with the help of results from two experiments. The first experiment was carried out to determine the time the consolidation solution requires to reach a predetermined viscosity, this time gives an indication of how long it takes before the consolidation solution becomes too viscous to be pumpable. The second experiment was carried out to determine how long it would take before the resin would set when carrying out the full treatment of the present invention; this latter experiment gives an indication of the time required to complete the job.

The first experiment comprises putting a consolidation solution comprising EPIKOTE 828 (Trade Name) and methylene dianiline in methoxypropanol having a solids content of 60m in a beaker and allowing a ball to fall through the consolidation solution. The velocity of the falling ball is an indirect measure of the viscosity of the consolidation solution. At regular intervals balls were dropped into the beaker, and the time was determined for the viscosity to raise to 100 miliPas.

The second experiment involves a dynamic mechanical analyses of a sample of Nieuwe Pekela sand that had been treated in accordance with the experiment as described in the specification of the present patent application in page 5, line 10 through page 6, line 14. Immediately after the treatment a thin section of the core was cut having a length of 2 cm, a width of 0.5 cm and a thickness of 1 mm. This section was supported on two blades near its outer ends, and at its middle the section was loaded with an alternating displacement having a fixed amplitude and frequency. The force required to maintain the displacement amplitude at the predetermined level was determined continuously until it became constant as the epoxy resin was set. The time elapsed until the force became constant is the setting time. If the aliphatic hydrocarbons-containing over-flush would only displace the superfluous resin one would expect that the time required to set would be larger than the time to reach a small viscosity, however, the results summarized below show that this is not the case. Therefore it is assumed that the over-flush extracts solvent from the consolidation solution so that the concentration of epoxy and curing agent in the remaining consolidation solution increases which shortens its setting time.

The results of the two experiments are summarized in the following Table 4.

TABLE 4

| | Time to set (in hours: minutes) | |
|---|---|---|
| | at 60° C. | at 74° C. |
| Falling ball | 9:08 | 4:17 |
| Dynamic analysis | 5:00 | 2:50 |

These experiments show clearly that using an over-flush of aliphatic hydrocarbons significantly reduces the setting time. With a conventional hydrocarbon over-flush, such as diesel oil, this result could not be achieved because the aromatic hydrocarbons in the diesel oil can dissolve epoxy resin and curing agent so that the concentration of reactants in the remaining consolidation solution will not increase. Consequently a longer setting time is expected.

We claim:

1. A method of treating an underground formation comprising the sequential steps of:

(a) contacting the formation with an aqueous medium;

(b) contacting the formation with a hydrocarbon fluid;

(c) contacting the formation with a solvent in the form of a glycol ether;

(d) contacting the formation with a consolidation solution of between 30 and 60% m of monomeric and/or polymeric organic polyepoxides having more than one epoxy group per molecule and between 5 and 20% m of a curing agent in the solvent; and (e) contacting the formation with a viscosified fluid containing aliphatic hydrocarbons wherein the polyepoxides are cured by the curing agent in the consolidation solution.

2. Method according to claim 1, wherein the glycol ether is selected from the group consisting of methoxypropanol, butoxyethanol, hexoxyethanol and the isomers of these glycol ethers.

3. The method of claim 1 wherein the viscosified fluid containing aliphatic hydrocarbons consists essentially of aliphatic hydrocarbons.

4. Method of claim 1 wherein the hydrocarbon fluid of step (b) is a fluid containing aliphatic hydrocarbons.

5. The method of claim 4 wherein the fluid of step (b) consists essentially of aliphatic hydrocarbons.

* * * * *